US010081850B2

(12) United States Patent
Sato et al.

(10) Patent No.: US 10,081,850 B2
(45) Date of Patent: Sep. 25, 2018

(54) TREATMENT METHOD FOR SOLUTION CONTAINING METAL IONS USING CATION ADSORBENT

(71) Applicants: Kabushiki Kaisha Toshiba, Tokyo (JP); Toshiba Materials Co., Ltd., Yokohama-Shi (JP)

(72) Inventors: Akira Sato, Yokohama (JP); Daisuke Fukushi, Yokohama (JP); Takao Kusaka, Yokohama (JP); Kayo Nakano, Yokohama (JP); Yukiko Inui, Yokohama (JP); Akito Sasaki, Yokohama (JP)

(73) Assignees: Kabushiki Kaisha Toshiba, Minato-Ku (JP); Toshiba Materials Co., Ltd., Yokohama-Shi (JP)

( * ) Notice: Subject to any disclaimer, the term of this patent is extended or adjusted under 35 U.S.C. 154(b) by 0 days.

(21) Appl. No.: 15/177,455

(22) Filed: Jun. 9, 2016

(65) Prior Publication Data
US 2016/0289794 A1 Oct. 6, 2016

Related U.S. Application Data

(60) Division of application No. 14/182,806, filed on Feb. 18, 2014, now Pat. No. 9,409,144, which is a continuation of application No. PCT/JP2012/005275, filed on Aug. 23, 2012.

(30) Foreign Application Priority Data

Aug. 23, 2011 (JP) ................. 2011-182032

(51) Int. Cl.
| | |
|---|---|
| *C22B 26/10* | (2006.01) |
| *C01G 41/02* | (2006.01) |
| *C02F 1/28* | (2006.01) |
| *G21F 9/12* | (2006.01) |
| *B01J 20/06* | (2006.01) |
| *B82Y 30/00* | (2011.01) |
| *B01J 20/28* | (2006.01) |
| *B01D 15/36* | (2006.01) |
| *B01D 21/01* | (2006.01) |
| *C02F 1/52* | (2006.01) |
| *C02F 101/00* | (2006.01) |
| *C02F 101/20* | (2006.01) |
| *C02F 103/08* | (2006.01) |
| *C02F 101/10* | (2006.01) |

(52) U.S. Cl.
CPC ............. *C22B 26/10* (2013.01); *B01D 15/36* (2013.01); *B01D 21/01* (2013.01); *B01J 20/06* (2013.01); *B01J 20/28004* (2013.01); *B01J 20/28016* (2013.01); *B01J 20/28057* (2013.01); *B01J 20/28059* (2013.01); *B01J 20/28061* (2013.01); *B01J 20/28064* (2013.01); *B82Y 30/00* (2013.01); *C01G 41/02* (2013.01); *C02F 1/281* (2013.01); *C02F 1/5272* (2013.01); *G21F 9/12* (2013.01); *G21F 9/125* (2013.01); *C01P 2004/64* (2013.01); *C01P 2006/12* (2013.01); *C02F 2101/006* (2013.01); *C02F 2101/10* (2013.01); *C02F 2101/20* (2013.01); *C02F 2103/08* (2013.01)

(58) Field of Classification Search
CPC ........ C22B 26/10; B01D 15/36; B01D 21/01; B01J 20/06; B01J 20/28004; B01J 20/28016; B01J 20/28057; B01J 20/28059; B01J 20/28061; B01J 20/02; B01J 20/28064; C02F 1/5272; C02F 1/281; G21F 9/125; G21F 9/12; B82Y 30/00; C01G 41/02
See application file for complete search history.

(56) References Cited

U.S. PATENT DOCUMENTS

| | | | |
|---|---|---|---|
| 5,217,585 A | 6/1993 | Snyder et al. | |
| 2005/0247635 A1* | 11/2005 | Vo .................. | B01D 53/02 210/685 |
| 2006/0249461 A1* | 11/2006 | Luca ................ | G21F 9/12 210/688 |
| 2008/0006954 A1 | 1/2008 | Yubuta et al. | |
| 2009/0029851 A1* | 1/2009 | Takeshima ........ | B01D 53/945 502/304 |
| 2010/0113254 A1 | 5/2010 | Sato et al. | |
| 2010/0204040 A1 | 8/2010 | Nakano et al. | |
| 2011/0212298 A1 | 9/2011 | Nakano et al. | |
| 2011/0290732 A1 | 12/2011 | Pacary et al. | |
| 2014/0033868 A1* | 2/2014 | Elsafty ............. | C22B 3/24 75/300 |
| 2015/0266752 A1* | 9/2015 | Sekiguchi ......... | C02F 1/288 210/96.1 |

FOREIGN PATENT DOCUMENTS

| | | |
|---|---|---|
| JP | 59-180397 A1 | 10/1984 |
| JP | 60-054783 A1 | 3/1985 |
| JP | 62-22097 A1 | 1/1987 |
| JP | 62-158805 A1 | 7/1987 |
| JP | 05-031358 A1 | 2/1993 |
| JP | 07-280998 A1 | 10/1995 |

(Continued)

OTHER PUBLICATIONS

Japanese Notice of Allowance (Application No. 2015-184749) dated Dec. 6, 2016 (with English Translation).

(Continued)

Primary Examiner — Chester T Barry
(74) Attorney, Agent, or Firm — Burr & Brown, PLLC

(57) ABSTRACT

A cation adsorbent of an embodiment includes tungsten oxide particles having a BET specific surface area in a range of 0.82 m²/g or more and 820 m²/g or less. The cation adsorbent is added to a solution to be treated containing cations being recovery objects, and the cation adsorbent adsorbing the cations is precipitated. The generated precipitate is separated from the solution to recover the cations.

6 Claims, No Drawings

(56) References Cited

FOREIGN PATENT DOCUMENTS

| | | |
|---|---|---|
| JP | 09-249542 A1 | 9/1997 |
| JP | 10-095617 A1 | 4/1998 |
| JP | 11-253967 A1 | 9/1999 |
| JP | 2004-532725 A1 | 10/2004 |
| JP | 2006-102737 A | 4/2006 |
| JP | 2007-185581 A1 | 7/2007 |
| JP | 2008-238057 A1 | 10/2008 |
| JP | 2010-190749 A1 | 9/2010 |
| WO | 2008/117655 A1 | 10/2008 |
| WO | 2009/031317 A1 | 3/2009 |
| WO | 2010-049396 A1 | 5/2010 |

OTHER PUBLICATIONS

Japanese Office Action (Application No. 2015-184749) dated Sep. 13, 2016 (with English translation).
Shorei Wang et al, "Study of Synthesis and Dye Adsorption Capacity of Bar-Shaped $WO_3$," Dec. 2010, National Meeting Regarding Photochemistry and Photocatalyst of Solar Energy, pp. 398-399.
F.R. Sale, "Heat Capacities of the Tungsten Oxides $WO_3$, $W_{20}O_{58}$, $W_{18}O_{49}$ and $WO_2$," *Thermochimica Acta*, vol. 30, 1979, pp. 163-171.
International Search Report (Application No. PCT/JP2012/005275) dated Nov. 27, 2012.
Japanese Office Action (Application No. 2013-529898) dated Jun. 23, 2015.
Chinese Office Action (Application No. 201280040698.9) dated Feb. 24, 2016 (with English translation).

\* cited by examiner

TREATMENT METHOD FOR SOLUTION CONTAINING METAL IONS USING CATION ADSORBENT

CROSS REFERENCE TO RELATED APPLICATION

This application is a division of U.S. application Ser. No. 14/182,806, filed Feb. 18, 2014, now U.S. Pat. No. 9,409,144, which in turn is a continuation of International Application No. PCT/JP2012/005275 filed Aug. 23, 2012, which designated the United States, and claims the benefit of Japanese Application No. 2011-182032 filed Aug. 23, 2011, the entireties of which are incorporated herein by reference.

FIELD OF THE INVENTION

Embodiments described herein relate generally to a cation adsorbent and a treatment method for solution using the same.

BACKGROUND OF THE INVENTION

Conventionally, selective separation and recovery of a predetermined component from a solution to be treated where various components exist together are performed in fields of a resource recovery, a wastewater treatment, an analytical chemistry, or the like. As methods separating and recovering the component dissolved in the solution to be treated, various methods such as a cation exchange resin method, an inorganic ion adsorption method, an electrolytic method are used in accordance with characteristics of a substance to be a separation object. Among them, a recovery method by using an inorganic ion exchanger using zeolite as an exchanger is considered as a practical method from a point of view of a cost for recovery.

In the recovery method using the inorganic ion exchanger, recovery efficiency is affected by the characteristics of the substance to be the recovery object. Therefore, it is an actual circumstances in which an adsorption substance is examined by each substance to enable the effective recovery. Accordingly, research and development to select an appropriate method are performed in each field as for the recovery methods and the adsorption substances. In particular, high-level radioactive substances such as a cesium (Cs) ion, a strontium (Sr) ion, an iodine (I) ion, and lithium (Li) ion are contained in wastewater discharged from a nuclear power plant. In consideration of influences on environment and human bodies, an expectation for an adsorption substance having higher recovery efficiency has risen.

In a conventionally used adsorbent to recover metal cations, a substance to be adsorbed is limited according to characteristics thereof. Recoveries of various substances are required aiming for an antipollution measure, a recovery for industry, and so on. Therefore, an expectation for an adsorbent capable of recovering substances which are conventionally difficult for recovery and whose recovery efficiency is bad, with high efficiency rises.

DETAILED DESCRIPTION OF THE INVENTION

According to one embodiment, there is provided a cation adsorbent including tungsten oxide particles having a BET specific surface area within a range of 0.82 m$^2$/g or more and 820 m$^2$/g or less. Further, according to another embodiment, there is provided a treatment method of a solution: adding the cation adsorbent according to the embodiment to a solution to be treated containing cations being recovery objects to let the cation adsorbent adsorb the cations; precipitating the cation adsorbent adsorbing the cations to obtain precipitate; and separating the precipitate from the solution to recover the cations.

Hereinafter, a cation adsorbent and a treatment method of a solution using the same according to an embodiment will be described. The cation adsorbent according to the embodiment includes tungsten oxide particles (fine powder) having a BET specific surface area in a range of 0.82 m$^2$/g or more and 820 m$^2$/g or less. As compound modes of the tungsten oxide, $WO_3$, $W_{20}O_{58}$, $W_{18}O_{49}$, $WO_2$, and so on are known, and an effect can be obtained by using any tungsten oxides. Among them, it is preferable that tungsten trioxide ($WO_3$) is used for the cation adsorbent.

The cation adsorbent of the embodiment has a minus surface potential when it is added to a solution. When the cation adsorbent is added to a solution to be treated containing cations to be recovered, the cations are drawn to a surface of the cation adsorbent and adsorbed. The cation adsorbent adsorbing the cations precipitates. Therefore, the specific surface area of the tungsten oxide particle is preferably large to let it exhibit a high adsorption capability. When the BET specific surface area of the tungsten oxide particle is less than 0.82 m$^2$/g, enough adsorption performance cannot be obtained, and recovery efficiency of the cations is lowered. When the BET specific surface area of the tungsten oxide particle exceeds 820 m$^2$/g, practicality of the cation adsorbent is lowered because the particles are too small and handleability thereof deteriorates.

In the cation adsorbent of the embodiment, the BET specific surface area of the tungsten oxide particle is preferably within a range of 11 m$^2$/g to 300 m$^2$/g, and more preferably within a range of 16 m$^2$/g to 150 m$^2$/g. A particle diameter of the tungsten oxide particle converted from the BET specific surface area is preferably in a range of 1 nm to 1000 nm. When an equivalent particle diameter exceeds 1000 nm, the enough adsorption performance cannot be obtained, and the recovery efficiency of the cations is lowered. When the equivalent particle diameter is less than 1 nm, the practicality of the cation adsorbent is lowered because the particles are too small and the handleability thereof deteriorates. The particle diameter converted from the BET specific surface area of the tungsten oxide particle is more preferably within a range of 2.7 nm to 75 nm, and further preferably within a range of 5.5 nm to 51 nm.

The cation adsorbent of the embodiment exhibits high adsorption performance when the cation to be adsorbed is at least one ion selected from a cesium (Cs) ion, a strontium (Sr) ion, an iodine (I) ion, and a lithium (Li) ion. Among these metal ions, the Cs ion, the Sr ion, the I ion, and the Li ion are the metal ions being high-level radioactive substances contained in the wastewater discharged from nuclear facilities. An adsorbent having the high adsorption performance for these metal ions is desired in consideration of influences on environment and human bodies. The cation adsorbent of the embodiment has the high adsorption performance for the Cs ion, the Sr ion, the I ion, and the Li ion, and it shows high effect on the separation, the recovery of the high-level radioactive substances from the wastewater discharged from the nuclear facilities, and detoxication of the wastewater.

The cation adsorbent of the embodiment preferably has an adsorption ratio of the Cs ion higher than an adsorption ratio of a sodium (Na) ion under an environment where the Na ion exists together. Further, the cation adsorbent preferably has the adsorption ratio of the Cs ion higher than adsorption ratios of at least one ion selected from a magnesium (Mg) ion, a calcium (Ca) ion, and a potassium (K) ion under an environment where these metal ions exist together. The Na ion, the Mg ion, the Ca ion, the K ion contain in seawater, soil, and so on. The cation adsorbent of the embodiment has the adsorption ratio of the Cs ion higher than the adsorption ratios of these metal ions, and therefore, it is possible to effectively recover the Cs ion being the radioactive substance from the seawater, the soil, and so on containing the radioactive substances. The cation adsorbent of the embodiment shows high effect on detoxication of the seawater and the soil containing the radioactive substances.

The cation adsorbent of the embodiment preferably has an adsorption ratio of the Sr ion higher than the adsorption ratio of the Na ion under the environment where the Na ion exists together. Further, the cation adsorbent preferably has the adsorption ratio of the Sr ion higher than the adsorption ratios of at least one ion selected from the Mg ion, the Ca ion, and the K ion under the environment where these metal ions exist together. The cation adsorbent of the embodiment has the adsorption ratio of the Sr ion higher than the adsorption ratios of the Na ion, the Mg ion, the Ca ion, and the K ion, and therefore, it is possible to effectively recover the Sr ion being the radioactive substance from the seawater, the soil, and so on containing the radioactive substances. The cation adsorbent of the embodiment shows the high effect on the detoxication of the seawater and the soil containing the radioactive substances.

The cation adsorbent of the embodiment preferably has the adsorption ratio of the Cs ion of 90% or more when the solution to be treated is the seawater containing the Cs ion. The adsorption ratio of the cations is represented by the following expression (1). In the expression (1), "ACA" is a cation amount in the solution before the treatment, and "BCA" is the cation amount in the solution after the treatment.

$$\text{Adsorption ratio (\%)} = (ACA - BCA)/ACA \times 100$$

The adsorption ratio of the Cs ion by the cation adsorbent is more preferably 95% or more, and further preferably 99% or more. The higher the adsorption radio (recovery ratio) of the Cs ion is, the higher effect for the detoxication of the wastewater from the nuclear facilities is shown.

In the cation adsorbent of the embodiment, the tungsten oxide particles may be dispersed in an aqueous dispersion medium. Water can be cited as a representative example of the aqueous dispersion medium, and a small amount of alcohol and so on may be contained therein in some cases. A dispersion liquid in which the tungsten oxide particles are dispersed in the aqueous dispersion medium in advance at a predetermined concentration can be used to enhance dispersibility of the tungsten oxide particles in the solution. The dispersion liquid containing the cation adsorbent is added to the solution, it is uniformized by stirring and so on, and thereby, the dispersibility of the tungsten oxide particles in the solution is improved further more. Accordingly, it is possible to enhance the adsorption efficiency of the cations being the recovery objects by the cation adsorbent.

A treatment method of a solution of the embodiment includes: a process adding the cation adsorbent according to the embodiment to a solution to be treated containing the cations being recovery objects to let the cation adsorbent adsorb the cations; a process precipitating the cation adsorbent adsorbing the cations; and a process separating the generated precipitate from the solution to recover the cations. The cation adsorbent of the embodiment has the high adsorption performance for the cations (metal ions) such as the Cs ion, the Sr ion, the I ion, and the Li ion, and therefore, it is possible to efficiently separate and recover the cations from the solution to be treated. The cation adsorbent may be added to the solution under a state dispersed in the aqueous dispersion medium as stated above. It is thereby possible to enhance adsorption efficiency and recovery efficiency of the cations.

In the treatment method of the solution of the embodiment, the generated precipitate is separated from the solution by methods such that it is centrifuged, only the precipitate is discharged from a container, and only supernatant is discharged from the container. The cation adsorbent of the embodiment has advantages such that a volume capacity of the precipitate is smaller compared to conventional zeolite and so on in addition that it has high adsorption performance for the cations. Accordingly, it is possible to reduce a volume capacity of waste. The solution to which the cation adsorbent is added or the generated precipitate may be treated with an organic coagulant. The organic coagulant is added to the solution, and thereby, the cation adsorbent adsorbing the cations effectively precipitates. The organic coagulant is added to the precipitate, and thereby, the volume capacity of the precipitate decreases. It is thereby possible to further reduce the volume capacity of the precipitate. When the precipitate is processed as the waste, it becomes possible to remarkably lower the load to environment by reducing the volume capacity of the precipitate.

The organic coagulant is an organic polymer compound having functions and so on adsorbing at a particle surface by actions such as static electricity attraction, hydrogen bond, hydrophobic bond, changing a surface potential, and forming floc by making the particles coarse by crosslinking and an adsorption action by adding the particles to the solution and sludge. The organic coagulant is used, and thereby, it is possible to improve generation efficiency of the precipitate, and to reduce the volume capacity of the precipitate. Further, it is possible to suppress that the cations recovered from the precipitate elute again. It is thereby possible to improve the recovery efficiency of the cations being treatment objects and to reduce the environmental load when the precipitate is discarded as an industrial waste.

Various methods are known as methods obtaining the tungsten oxide particles. A manufacturing method of the tungsten oxide particles used as the cation adsorbent of the embodiment is not particularly limited. As the manufacturing methods of the tungsten oxide particle, (A) a method obtaining an oxide by a sublimation process, (B) a method directly oxidizing metal tungsten, (C) a method obtaining an oxide by pyrolyzing a tungsten compound such as ammonium paratungstate (APT) in the air, and so on can be cited. The tungsten oxide particles are preferably manufactured by applying the sublimation process. According to the tungsten trioxide particles manufactured by applying the sublimation process, the above-stated BET specific surface area can be obtained with good reproducibility. Further, it is possible to stably obtain the tungsten trioxide particles whose particle diameter variation is small.

The manufacturing method of the tungsten oxide particles applying the sublimation process is described. The sublimation process is a process obtaining the tungsten trioxide particles by sublimating a metal tungsten powder, a tungsten compound powder, or a tungsten compound solution to be a raw material in an oxygen atmosphere. The sublimation is a phenomenon in which a change of state from a solid phase to a gas phase, or the gas phase to the solid phase occurs without passing through a liquid phase. The metal tungsten powder, the tungsten compound powder, or the tungsten compound solution as the raw material is oxidized while performing the sublimation, and thereby, it is possible to obtain the tungsten oxide particles of the embodiment.

As a method sublimating the above-stated raw materials in the oxygen atmosphere, at least one process selected from an inductively-coupled plasma process, an arc discharge process, a laser process, an electron beam process, and a gas burner process can be cited. In the laser process and the electron beam process, the sublimation process is performed by irradiating a laser or an electron beam. The laser and the electron beam have a small irradiation spot diameter, and therefore, there is a defect in which it takes a long time to process a lot of raw materials at a time, but there is an advantage in which it is not necessary to strictly control a particle diameter and stability of a supply amount of a raw material powder.

In the inductively-coupled plasma process and the arc discharge process, it is possible enable an oxidation reaction of a lot of raw material powder at a time in the oxygen atmosphere, though an adjustment of generation areas of a plasma and an arc discharge is required. Further, it is possible to control the amount of the raw materials which can be processed at a time. In the gas burner process, it is difficult to process a lot of raw materials, and it deteriorates in productivity, but is advantageous in a point in which a power cost is comparatively cheap. When the gas burner process is applied, gas is not particularly limited as long as the gas burner has enough energy to sublimate the raw materials. A propane gas burner, an acetylene gas burner, and so on are used.

The manufacturing method of the tungsten oxide particles using the APT is described. For example, the APT is grinded by a bead mill, a satellite mill, and so on, then is classified by centrifugal separation. These particles are heat treated at a temperature of 400° C. to 600° C. in the atmosphere, and thereby, it is possible to manufacture the tungsten oxide particles. As another method, a method in which the APT is dissolved in an aqueous solvent, and thereafter, a recrystallized crystal is burned under a condition at 600° C. or more for 15 seconds or more to thereby manufacture the tungsten oxide particles can be cited. In any methods, it is possible to obtain the tungsten oxide particles with a preferable average particle diameter by adjusting heat treatment conditions.

The cation adsorbent of the embodiment includes the tungsten oxide particles having the large specific surface area, concretely the BET specific surface area of 0.82 $m^2/g$ to 820 $m^2/g$, and therefore, it is possible to efficiently adsorb the metal cations which are conventionally difficult to be recovered to the cation adsorbent by adding the cation adsorbent into the solution containing the metal cations being the recovery objects. Further, it has high adsorption performance for the Cs ion, the Sr ion, the I ion, and the Li ion, and therefore, it is possible to efficiently recover these metal cations from the wastewater of the nuclear facilities. Accordingly, it shows high effect on the detoxication of the wastewater from the nuclear facilities. The precipitate of the cation adsorbent adsorbing the metal cations has a small volume capacity compared to a conventional adsorbent, and therefore, it is possible to reduce the amount of the industrial waste. It becomes thereby possible to provide the recovery method of an environmental pollutant in which the environmental load is reduced.

Next, concrete examples of the present invention and evaluation results thereof are described. In the examples illustrated in the following, the inductively-coupled plasma process is applied as the sublimation process in the manufacturing process of the tungsten oxide particles, but the manufacturing process of the tungsten oxide particles used as the cation adsorbent is not limited thereto.

Examples 1 to 4, Comparative Examples 1 to 2

The tungsten oxide particles were manufactured by the inductively-coupled plasma process. The BET specific surface area of the obtained tungsten oxide particle was 41.1 $m^2/g$. The particle diameter converted from the BET specific surface area thereof was about 20 nm.

Mixed aqueous solutions of NaCl and CsCl each having an Na ion concentration and a Cs ion concentration as illustrated in Table 1 were prepared, and the tungsten oxide particles were added to these aqueous solutions at amounts as illustrated in Table 1. After the tungsten oxide particles were added, they were stirred with a stirrer for four hours, and thereafter, they were left at rest. A supernatant liquid of each sample was split, and a Cs ion amount and an Na ion amount were measured by an ICP mass spectrometry. Samples in which the tungsten oxide particles were not added are used as comparative examples.

TABLE 1

| | $WO_3$ Solution Amount [g] | $WO_3$ Addition Amount [g] | $Na^+$ Concentration [mg/L] Before Addition of $WO_3$ | $Na^+$ Concentration [mg/L] After Addition of $WO_3$ | $Cs^+$ Concentration [mg/L] Before Addition of $WO_3$ | $Cs^+$ Concentration [mg/L] After Addition of $WO_3$ |
|---|---|---|---|---|---|---|
| Example 1 | 20.00 | 1.0062 | 4900 | 4800 | 1 | <0.005 |
| Example 2 | 20.05 | 1.9995 | 4900 | 4800 | 1 | <0.005 |
| Comparative Example 1 | 20.00 | none | 4900 | 4900 | 1 | 1 |
| Example 3 | 20.02 | 1.0062 | 740 | 690 | 1 | <0.005 |
| Example 4 | 20.01 | 2.0006 | 740 | 660 | 1 | <0.005 |
| Comparative Example 2 | 20.00 | none | 740 | 740 | 1 | 1 |

Examples 5 to 8, Comparative Example 3

The tungsten oxide particles were manufactured by the inductively-coupled plasma process. The BET specific surface area of the obtained tungsten oxide particle was 91.3 $m^2/g$. The particle diameter converted from the BET specific surface area was about 9 nm.

Mixed aqueous solutions of NaCl and CsCl each having the Na ion concentration and the Cs ion concentration as illustrated in Table 2 were prepared, and the tungsten oxide particles were added to these aqueous solutions at amounts as illustrated in Table 2. After the tungsten oxide particles were added, they were stirred with a stirrer for four hours, and thereafter, they were left at rest. A supernatant liquid of each sample was split, and the Cs ion amount and the Na ion amount were measured by the ICP mass spectrometry. A sample in which the tungsten oxide particles are not added was used as a comparative example.

TABLE 2

| | $WO_3$ Solution Amount [g] | $WO_3$ Addition Amount [g] | $Na^+$ Concentration [mg/L] Before Addition of $WO_3$ | $Na^+$ Concentration [mg/L] After Addition of $WO_3$ | $Cs^+$ Concentration [mg/L] Before Addition of $WO_3$ | $Cs^+$ Concentration [mg/L] After Addition of $WO_3$ |
|---|---|---|---|---|---|---|
| Example 5 | 19.9970 | 0.0101 | 4800 | 4800 | 1 | 0.14 |
| Example 6 | 19.9894 | 0.1009 | 4800 | 4800 | 1 | 0.006 |
| Example 7 | 19.9884 | 10.5017 | 4800 | 4800 | 1 | <0.005 |

TABLE 2-continued

| | WO$_3$ Solution Amount [g] | WO$_3$ Addition Amount [g] | Na$^+$ Concentration [mg/L] Before Addition of WO$_3$ | Na$^+$ Concentration [mg/L] After Addition of WO$_3$ | Cs$^+$ Concentration [mg/L] Before Addition of WO$_3$ | Cs$^+$ Concentration [mg/L] After Addition of WO$_3$ |
|---|---|---|---|---|---|---|
| Example 8 | 19.9700 | 1.0093 | 4800 | 4700 | 1 | <0.005 |
| Comparative Example 3 | 19.4580 | none | 4800 | 4800 | 1 | 1 |

As it is obvious from the above-stated results of the examples, when the tungsten oxide particles of the embodiment are added to the solution to be treated, an Na$^+$ ion amount in the solution seldom changes before and after the addition, and an amount of the Na$^+$ ion adsorbed to the tungsten oxide particles (adsorbent) is detection accuracy or less. On the other hand, a Cs$^+$ ion amount obviously decreases before and after the addition of the tungsten oxide particles. As for a sample in which enough amount of tungsten oxide particles for the adsorption of the Cs$^+$ ion in the solution is added, 90% or more of a content before the addition is adsorbed to the tungsten oxide particles, and it is verified that it is possible to reduce the Cs$^+$ ion amount up to a detection limit or less of the ICP mass spectrometry.

Example 9

The tungsten oxide particles were manufactured by the inductively-coupled plasma process. The BET specific surface area of the obtained tungsten oxide particle was 91.3 m$^2$/g. An aqueous dispersion liquid was prepared by dispersing 1 g of the tungsten oxide particles in 10 ml of water. The aqueous dispersion liquid containing the cation adsorbent was added to 10 ml of a solution containing the Sr ion, further it was stirred for four hours by a stirrer, and thereafter, it was left at rest. Precipitate was generated in the solution. A supernatant liquid was split from the solution, and a content of the Sr ion was measured by the ICP mass spectrometry. As a result, it was verified that the content of the Sr ion is 0.005 ppm, and the adsorption ratio of the Sr ion by the tungsten oxide particles (adsorbent) is 99.9% or more.

Example 10

The supernatant liquid was removed from the solution to be treated at the example 9, and the generated precipitate was separated. An amphoteric emulsion coagulant was added to the precipitate. It was verified that a volume capacity of the precipitate becomes small to be approximately a half of that before the addition, and handleability of the precipitate improves.

Example 11

The tungsten oxide particles were manufactured by the inductively-coupled plasma process. The BET specific surface area of the obtained tungsten oxide particle was 41.1 m$^2$/g. The particle diameter converted from the BET specific surface area was about 20 nm.

Then, 20 g of aqueous solution having the Na ion concentration, the Cs ion concentration, and the Sr ion concentration as illustrated in Table 3 was prepared. After 1.0062 g of the above-stated tungsten oxide (WO$_3$) particles were added to the aqueous solution, it was stirred for four hours by a stirrer, then it was left at rest. A supernatant liquid of the sample was split, and the Cs ion amount, the Sr ion amount, and the Na ion amount were measured by the ICP mass spectrometry. A result thereof is represented in Table 3.

TABLE 3

| | Na$^+$ Concentration [mg/L] Before Addition of WO$_3$ | Na$^+$ Concentration [mg/L] After Addition of WO$_3$ | Cs$^+$ Concentration [mg/L] Before Addition of WO$_3$ | Cs$^+$ Concentration [mg/L] After Addition of WO$_3$ | Sr$^+$ Concentration [mg/L] Before Addition of WO$_3$ | Sr$^+$ Concentration [mg/L] After Addition of WO$_3$ |
|---|---|---|---|---|---|---|
| Example 11 | 4900 | 4600 | 1 | <0.0003 | 1 | 0.5 |

As it is obvious from the result of the example 11, it is verified that it is possible to adsorb both the Cs ion and the Sr ion by adding the tungsten oxide particles of the embodiment to the solution. The adsorption ratio of the Cs ion is a little higher than that of the Sr ion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A treatment method of a solution, comprising:
    adding a cation adsorbent comprising tungsten oxide particles having a BET specific surface area in a range of 0.82 m$^2$/g or more and 820 m$^2$/g or less to a solution to be treated containing cations being recovery objects to let the cation adsorbent adsorb the cations;
    precipitating the cation adsorbent adsorbing the cations to obtain precipitate; and
    separating the precipitate from the solution to recover the cations,
    wherein the cation is at least one ion selected from the group consisting of a cesium (Cs) ion, a strontium (Sr) ion, an iodine (I) ion, and a lithium (Li) ion.

2. The treatment method of the solution according to claim 1, further comprising:
    preparing a dispersion liquid by dispersing the cation adsorbent in an aqueous dispersion medium,
    wherein the dispersion liquid containing the cation adsorbent is added to the solution.

3. The treatment method of the solution according to claim 1,
    wherein the solution in which the cation adsorbent is added or the precipitate is treated by using an organic coagulant.

4. The treatment method of the solution according to claim 1,
    wherein the solution contains a sodium (Na) ion together with the cation.

5. The treatment method of the solution according to claim 1,
    wherein the solution contains at least one ion selected from the group consisting of a magnesium (Mg) ion, a calcium (Ca) ion, and a potassium (K) ion together with the cation.

6. The treatment method of the solution according to claim 1, wherein the solution is seawater containing the cesium (Cs) ion, and an adsorption ration of the cesium (Cs) ion by the cation adsorbent is 90% or more.

* * * * *